(12) United States Patent  (10) Patent No.: US 9,007,318 B2
Goldman-Shenhar et al.  (45) Date of Patent: Apr. 14, 2015

(54) METHOD AND APPARATUS FOR PROVIDING INFORMATION RELATED TO AN IN-VEHICLE FUNCTION

(71) Applicant: GM Global Technology Operations LLC, Detroit, MI (US)

(72) Inventors: Claudia V. Goldman-Shenhar, Mevasseret Zion (IL); Omer Tsimhoni, Herzliya (IL); Amir Konigsberg, Herzliya Pituach (IL)

(73) Assignee: GM Global Technology Operations LLC, Detroit, MI (US)

( * ) Notice: Subject to any disclaimer, the term of this patent is extended or adjusted under 35 U.S.C. 154(b) by 262 days.

(21) Appl. No.: 13/756,733

(22) Filed: Feb. 1, 2013

(65) Prior Publication Data
US 2014/0218307 A1  Aug. 7, 2014

(51) Int. Cl.
*G06F 3/041* (2006.01)
*G09G 5/10* (2006.01)
*G06F 3/0488* (2013.01)

(52) U.S. Cl.
CPC .................... *G06F 3/0488* (2013.01)

(58) Field of Classification Search
CPC .............. G06F 3/0488; G06F 3/04842; G06F 3/04817; G06F 3/016; G06F 3/017; G09G 5/00
See application file for complete search history.

(56) References Cited

U.S. PATENT DOCUMENTS

| | | | |
|---|---|---|---|
| 7,129,933 B1 | 10/2006 | Nishikawa et al. | |
| 7,295,904 B2 | 11/2007 | Kanevsky et al. | |
| 2007/0152984 A1 | 7/2007 | Ording et al. | |
| 2008/0165141 A1 | 7/2008 | Christie | |
| 2009/0284479 A1 | 11/2009 | Dennis et al. | |
| 2011/0043468 A1 | 2/2011 | Lathrop et al. | |
| 2011/0082615 A1* | 4/2011 | Small et al. | 701/29 |
| 2011/0115719 A1 | 5/2011 | Ng | |
| 2012/0169623 A1 | 7/2012 | Grossman et al. | |
| 2012/0169653 A1 | 7/2012 | Chang | |

* cited by examiner

*Primary Examiner* — Michael Faragalla (57) ABSTRACT

A vehicle includes a multi-touch screen and a controller. A method for providing information related to a vehicle function includes visually displaying on the multi-touch screen a representation of a portion of the vehicle including a plurality of operating sections including a plurality of vehicle functions and a HELP icon. One of the vehicle functions is selected in response to a user action that includes a dragging motion on the multi-touch screen between the HELP icon and the selected vehicle function. Information related to the selected vehicle function is accessed. A preferred mode is employed to communicate the information related to the selected vehicle function to the user.

20 Claims, 5 Drawing Sheets

METHOD AND APPARATUS FOR PROVIDING INFORMATION RELATED TO AN IN-VEHICLE FUNCTION

TECHNICAL FIELD

This disclosure is related to in-vehicle systems and information related thereto.

BACKGROUND

The statements in this section merely provide background information related to the present disclosure. Accordingly, such statements are not intended to constitute an admission of prior art.

Vehicles include systems related to vehicle operation, in-vehicle functions, and in-vehicle information and entertainment (infotainment) that can be provided to the vehicle operator and passengers. Such systems may be employed to control and report vehicle operation, such as seat settings, windshield wiper operation, headlamp operation, window controls, HVAC, refueling, tire pressure monitoring, maintenance intervals, and the like. Such systems may be employed to provide vehicle operator assistance, such as navigation/GPS systems, cruise control, parking assistance, and the like. Such systems may be employed to provide information and entertainment, such as portable handheld devices, radios, DVD/CD players, in-vehicle Internet services, and the like.

Known help mechanisms for processor-controlled systems include FAQs (frequently asked questions) and menu-driven or searchable help databases in which a user searches by entering a query so as to find a solution to a problem. This process often requires effort, time, and focused attention, which may distract a vehicle operator.

SUMMARY

A vehicle includes a multi-touch screen and a controller. A method for providing information related to a vehicle function includes visually displaying on the multi-touch screen a representation of a portion of the vehicle including a plurality of operating sections including a plurality of vehicle functions and a HELP icon. One of the vehicle functions is selected in response to a user action that includes a dragging motion on the multi-touch screen between the HELP icon and the selected vehicle function. Information related to the selected vehicle function is accessed. A preferred mode is employed to communicate the information related to the selected vehicle function to the user.

BRIEF DESCRIPTION OF THE DRAWINGS

One or more embodiments will now be described, by way of example, with reference to the accompanying drawings, in which:

FIGS. 7-1 and 7-2 illustrate portions of a multi-touch screen that includes a HELP icon and an icon representing an operating section of the passenger compartment, and each depicts an action whereby a user employs a dragging motion on the multi-touch screen to initiate a query for information related to the selected operating section, in accordance with the disclosure.

DETAILED DESCRIPTION

Figure 1:
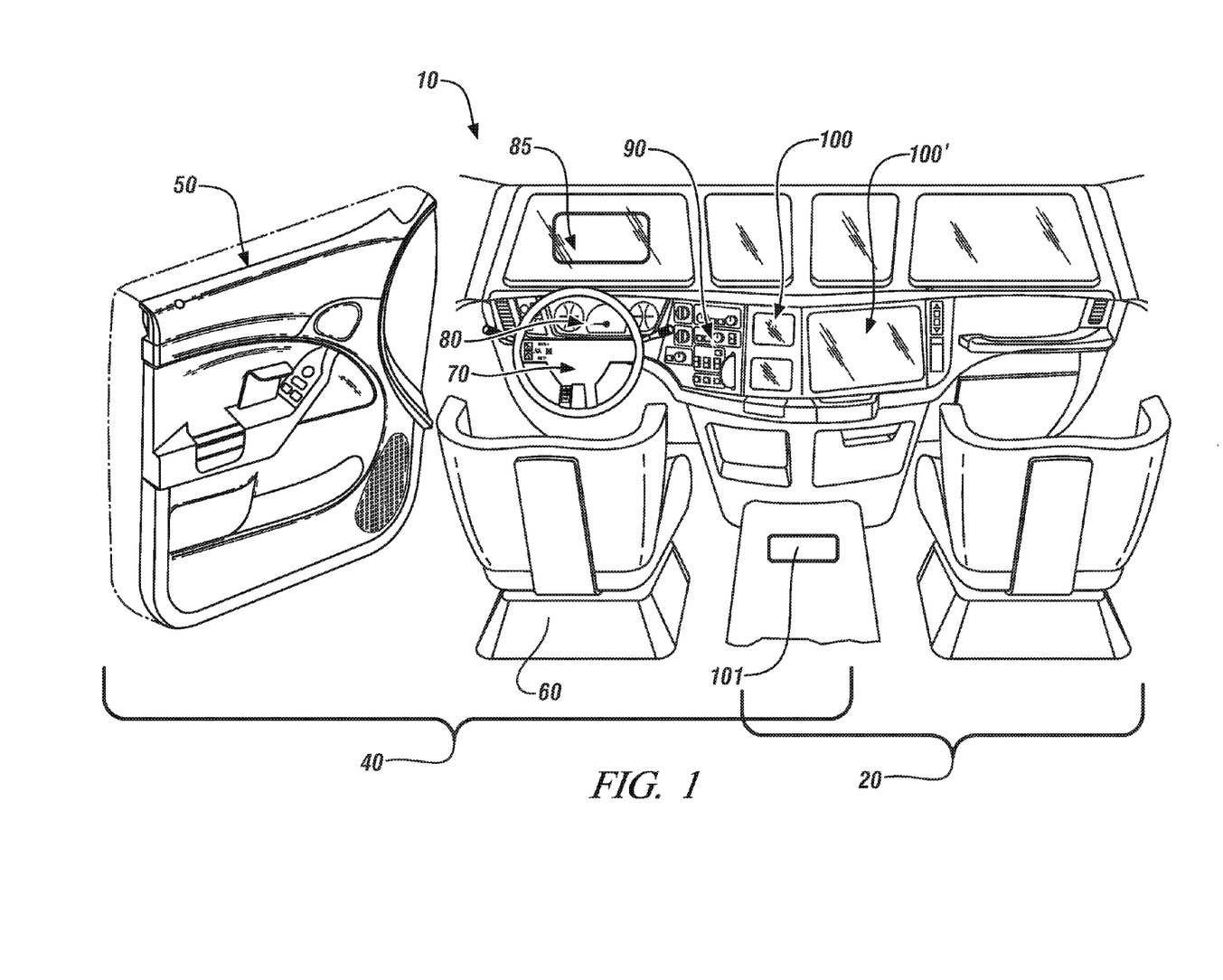
FIG. 1 illustrates a vehicle, in accordance with the disclosure.

Referring now to the drawings, wherein the showings are for the purpose of illustrating certain exemplary embodiments only and not for the purpose of limiting the same, FIG. 1 schematically shows a passenger compartment 10 of a vehicle. One non-limiting example of the vehicle includes a passenger vehicle having a propulsion system that includes an internal combustion engine alone or in combination with other torque-generative devices, ground-engaging wheels, and the passenger compartment 10. Other vehicle embodiments may be employed with similar effect, including by way of non-limiting examples, vehicles employing electro-mechanical hybrid powertrain systems and electric-only powertrain systems.

The passenger compartment 10 includes a driver area 40 and a front passenger area 20 that may overlap or share operating sections. Exemplary operating sections in the driver area 40 include a driver door 50, a driver seat 60, a steering wheel 70, an instrument panel 80, a heads-up display (HUD) 85, a center console 90, and a multi-touch screen 100. Operating sections in the passenger area 20 include the center console 90, the multi-touch screen 100, and a separate multi-touch screen 100'. Other suitable operating sections may be employed without limitation. As shown, the multi-touch screen 100 is a separate device from the multi-touch screen 100', and both are separate from the center console 90, although the system is not so limited. The multi-touch screen 100 may instead be included in the center console 90. It is appreciated that there may be a single multi-touch screen 100 that is shared by the driver and the passenger. A controller 101 signally and operatively connects to various operating sections of the vehicle including the multi-touch screen 100. There can be a single one or a plurality of controllers configured to control operation of a vehicle. The controller 101 is preferably configured with a telematics system that facilitates extra-vehicle communications for access to information services, navigation services, and other remotely accessible services.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing vehicle operation. Alternatively, routines may be executed in response to occurrence of an event.

Each of the operating sections preferably represents a portion of the vehicle that can be readily partitioned, and each contains a single one or a plurality of co-located vehicle functions. The co-located vehicle functions may act in concert (e.g., HVAC controls) or act independently (e.g., gages on the instrument panel). The co-located vehicle functions include a plurality of specific instrumentalities that are in the form of control knobs, switches, gages, indicator lamps, displays, and other suitable devices that can be employed to control specific vehicle functions or provide audio, visual, tactile, or other feedback related to specific vehicle functions. The vehicle functions may be independently controlled and executed by autonomous devices in response to a command, such as a vehicle window up/down system and associated toggle switch. The vehicle functions may be controlled and executed by inter-connected devices in response to a command, such as an HVAC system that may command changes to fan speed and temperature output to effect changes to cabin temperature. The vehicle functions may be outputs from on-vehicle sensors, such as a speedometer. The vehicle functions may be inputs to an on-vehicle actuator, such as a headlamp switch. Other vehicle functions and associated responses and controls are included without limitation.

Vehicle functions associated with the driver door 50 may include devices related to a door lock, a vehicle lock, left and right mirror adjustments, raising/lowering windows, seat adjustments, and others. Vehicle functions associated with the driver seat 60 may include devices for controlling the seat adjustments, e.g., control buttons for adjusting forward position, lumbar support, height, seat back angle, thigh support and others. Vehicle functions associated with the steering wheel 70 may include devices for activating and controlling cruise control including adaptive cruise control, audio system control, e.g., volume or channel selection, parking assistance, turn-signal activation, wiper control, and others. Vehicle functions associated with the instrument panel 80 may include gages including a speedometer, odometer, trip odometer, oil pressure indicator, temperature, service interval, malfunction indicator lamp (MIL), and others. Vehicle functions associated with the HUD 85 may include the aforementioned gages from the instrument panel 80, or other information. Some or all of the information displayed on the HUD 85 may be user-selectable. Vehicle functions associated with the center console 90 may include devices related to heating, ventilation, and air conditioning (HVAC) control, audio systems, GPS/navigation systems, and others.

The multi-touch screen 100 is a processor-controlled visual display device having a touch-sensitive functionality that includes a mapped function that is responsive to tactile input. The multi-touch screen 100 can also include an in-vehicle touch-sensitive audio-visual interactive display device in one embodiment. A user is able to interact with displayed items by employing tactile input to manipulate an on-screen image of a displayed item to activate, translate, rotate, or scale the on-screen image by tapping, dragging, rotating, or expanding/contracting, respectively at one or more on-screen contact points. In one embodiment, the multi-touch screen can be a mutual capacitive display device or a liquid crystal display (LCD) device configured to receive user inputs. Other suitable multi-touch screen display devices may be employed without limitation. The multi-touch screen 100 is configured to display a depiction of all or a portion of a virtual vehicle. A control system including controller 101 is configured to operate the multi-touch screen 100, including analyzing user inputs and communicating them to another device.

Figure 2:
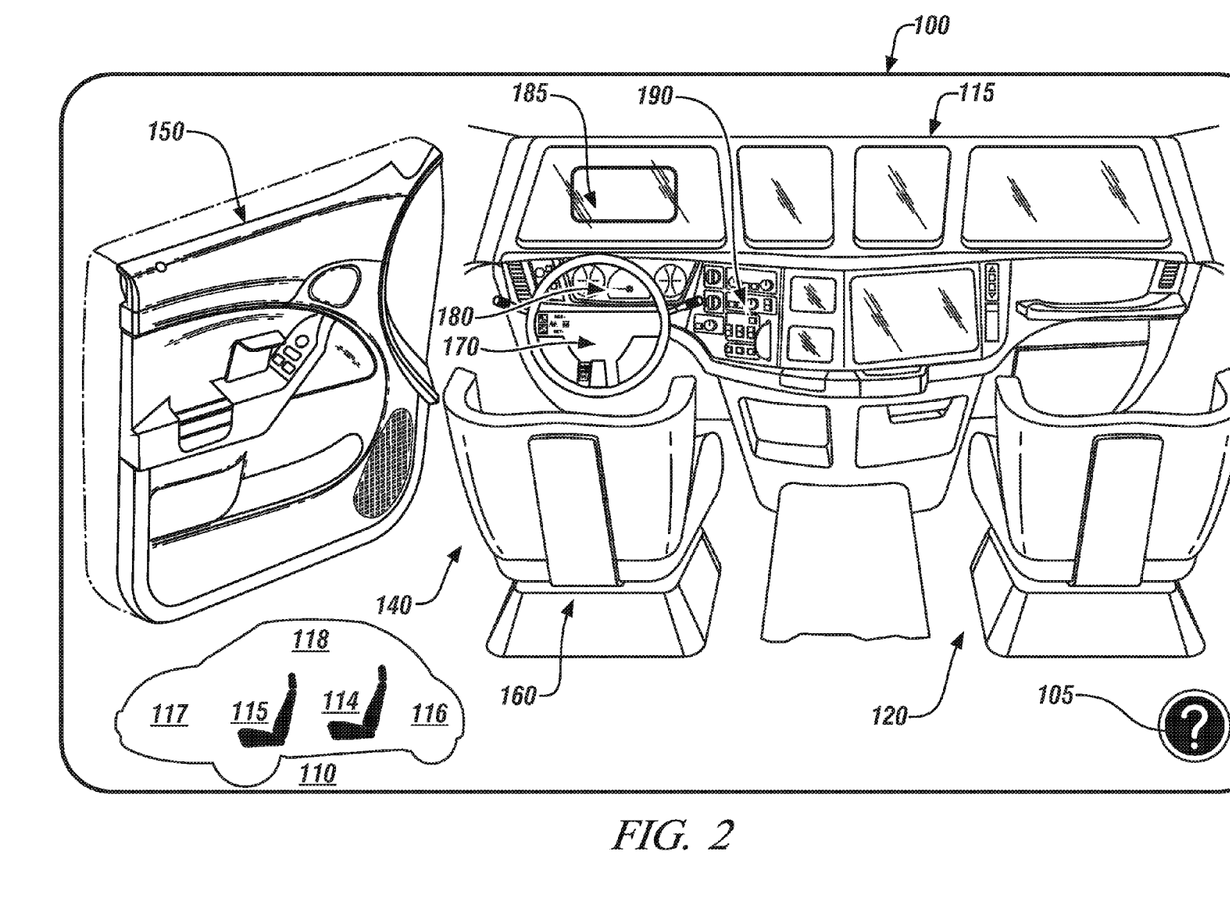
FIG. 2 illustrates a display on a multi-touch screen including a depiction of a passenger compartment including a driver area and a front passenger area, in accordance with the disclosure.

FIG. 2 schematically shows an embodiment of the multi-touch screen 100 including a depiction of a front seat portion 115 of a passenger compartment of a virtual vehicle 110. The depicted front seat portion 115 of the virtual vehicle 110 includes a driver area 140 and a front passenger area 120. Operating sections in the driver area 140 include a driver door 150, driver seat 160, steering wheel 170, instrument panel 180, HUD 185, and center console 190. Operating sections in the passenger area 120 include the center console 190. The display on the multi-touch screen 100 includes a HELP icon 105. The selected operating sections are illustrative of the concept and not meant to be comprehensive. Other or additional suitable operating sections may be employed with similar effect.

The display on the multi-touch screen 100 includes a complete vehicle schematic 110, which is displayed at the bottom on the multi-touch screen 100 in one embodiment. The complete vehicle schematic 110 can be accessed to display another portion of the virtual vehicle space by a user action of on-screen dragging of the total vehicle schematic drawing 110, thus enabling the user to pan around the complete vehicle schematic 110 to display additional operating sections the multi-touch screen 100. The complete vehicle schematic 110 preferably also indicates a direction needed to pan the image on the multi-touch screen 100 to display another operating section in the virtual vehicle space and associated vehicle functions, such as the front seat portion 115, a rear seat portion 114, an underhood portion 117, a trunk area 116 including, e.g., a spare tire/jack, and a sunroof/moonroof/convertible section 118. Other operating sections and vehicle functions may be displayed without limitation. The user can drag the HELP icon 105 onto a selected one of the vehicle functions to access related information.

Figure 5:
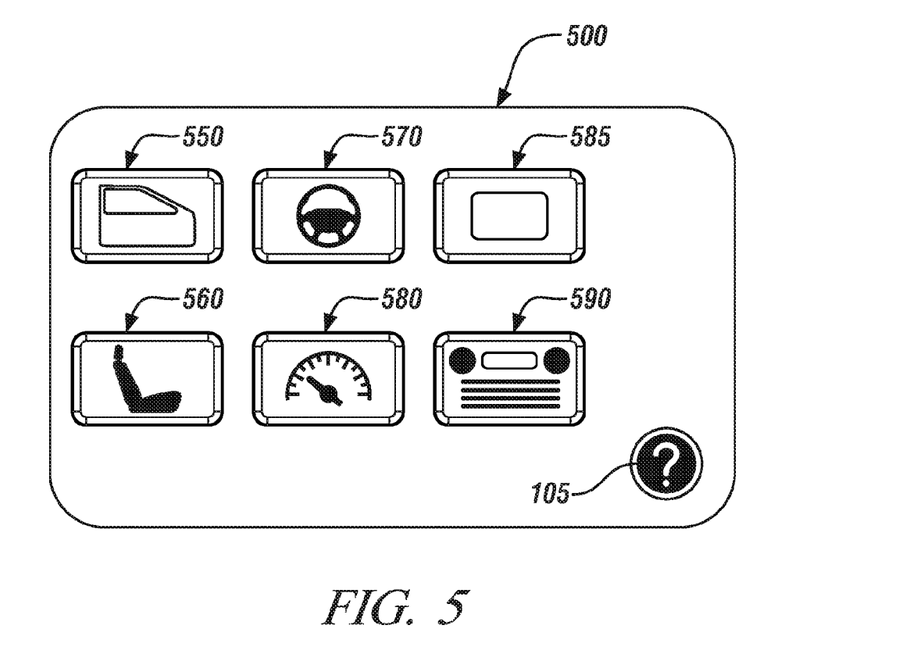
FIG. 5 illustrates a display on the multi-touch screen including an icon-driven display having a plurality of individual schematic representations of operating sections of the passenger compartment, in accordance with the disclosure.

FIG. 5 shows another embodiment of a display 500 on the multi-touch screen including an icon-driven display having a plurality of individual schematic representations of operating sections of the passenger compartment, including driver door controls 550, driver seat adjustment 560, steering wheel controls 570, instrument panel 580, HUD 585, and console 590 (including, e.g., HVAC, infotainment control, and navigation) and the HELP icon 105. The selected icons and associated operating sections are illustrative, and not comprehensive. Other icons may be employed with similar effect. A complete vehicle schematic drawing (described with reference to element 130 of FIG. 2) can be displayed at the bottom or another suitable location on the multi-touch screen, and employed as described herein. In operation, a user action of tapping on one of the icons causes the control system to display the selected operating section and its associated vehicle functions on-screen, e.g., as shown with reference to FIG. 3 along with the HELP icon 105. The user can drag the HELP icon 105 onto a selected one of the vehicle functions to access related information.

Figure 6:
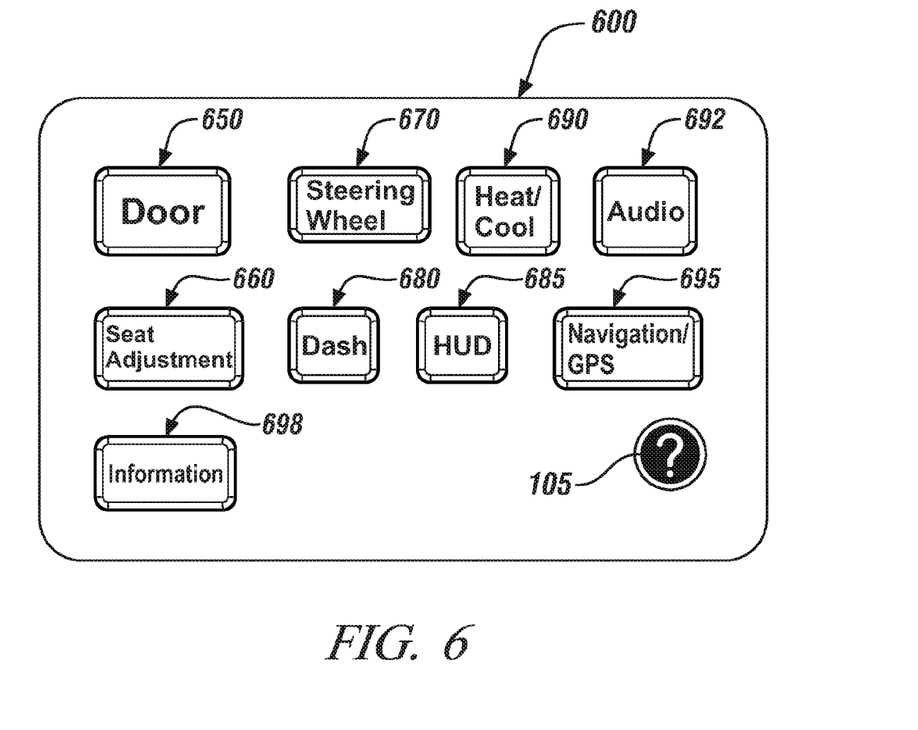
FIG. 6 illustrates a display on the multi-touch screen including a text-driven display having a plurality of individual buttons containing terms representing operating sections of the passenger compartment, in accordance with the disclosure.

FIG. 6 shows another embodiment of a display on the multi-touch screen 100 including a text-driven display having a plurality of individual buttons containing terms representing the operating sections of the passenger compartment, including driver door (DOOR) 650, driver seat (SEAT ADJUSTMENT) 660, steering wheel (STEERING WHEEL) 670, instrument panel (DASH) 680, HVAC control (HEAT/COOL) 690, and infotainment console elements (AUDIO) 692, navigation and mapping (NAVIGATION/GPS) 695, and information (INFORMATION) 698, and HELP icon 105. The terms are shown in the English language, and may be in any suitable language and may be selectable by the user. The selected terms are illustrative and not comprehensive. A complete vehicle schematic drawing (described with reference to element 130 of FIG. 2) can be displayed at the bottom or another suitable location on the multi-touch screen, and employed as described herein. Operation is as described with reference to FIG. 5. Other terms associated with the operating sections may be appropriate and employed with similar effect.

Figure 3:
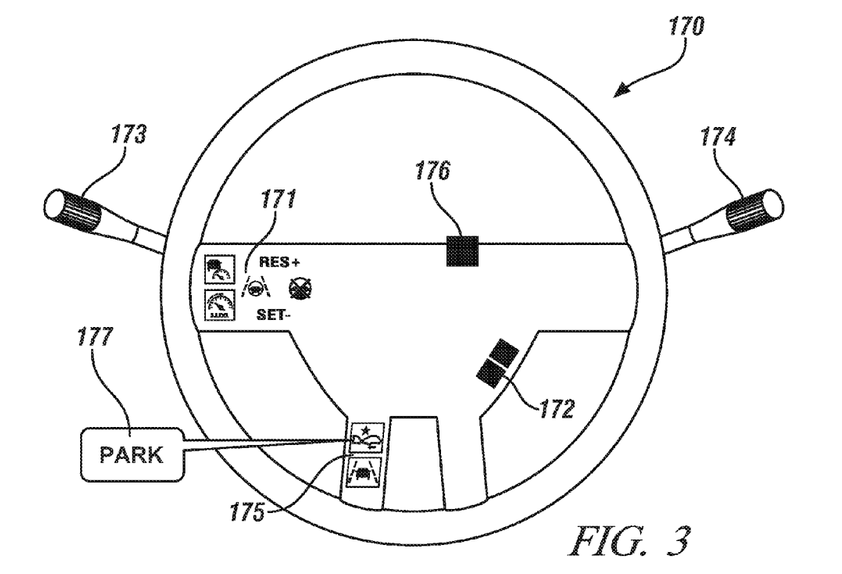
FIG. 3 illustrates a display on a multi-touch screen including a steering wheel, in accordance with the disclosure.

FIG. 3 schematically shows an embodiment of a display of one of the operating sections on the multi-touch screen 100, which is the steering wheel 170 as shown. Vehicle functions found in the steering wheel 170 include by way of example, cruise control 171, audio volume and programming control 172, directional indicator control 173, windshield wiper control 174, parking assistance control 175, and hazard lamp control 176. A display of one of the operating sections may include one or more alphanumeric callouts, e.g., a callout (PARK) 177 for the parking assistance control 175. The alphanumeric terms for each of the callouts are shown in the English language, and may be in any suitable language that may be selectable by the user.

Figure 4:
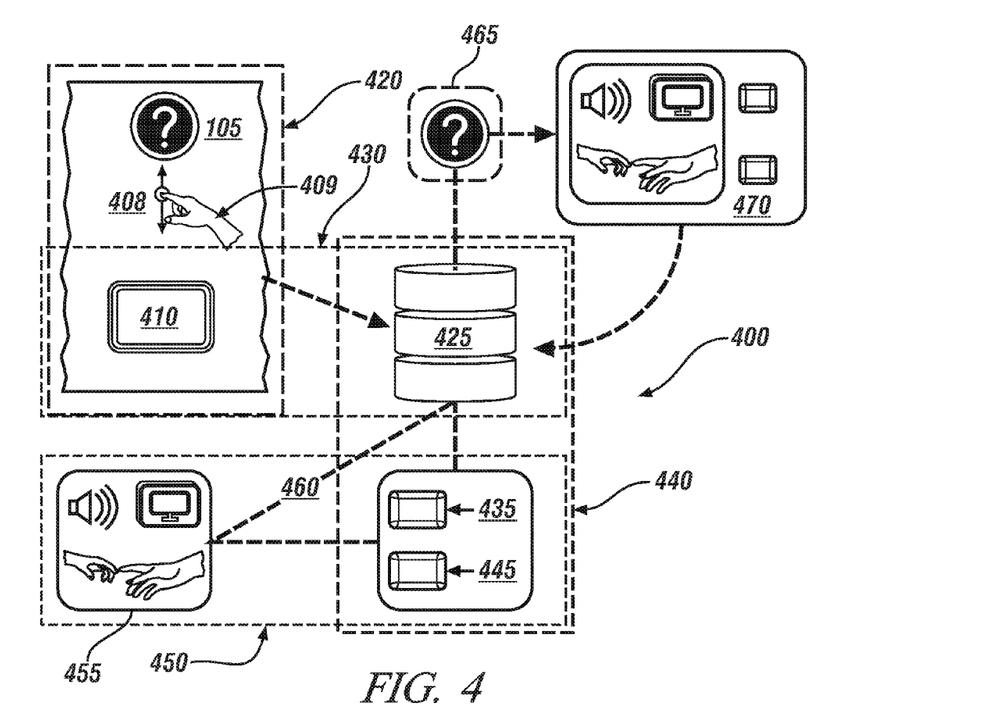
FIG. 4 illustrates a process flowchart for accessing descriptive information related to an operating section of the vehicle, including accessing information related to a specific vehicle function within a selected operating section of the vehicle, in accordance with the disclosure.

FIG. 4 illustrates a process flowchart 400 that includes a process for accessing descriptive information related to one of the operating sections of the vehicle, including accessing information related to a specific function within a selected operating section. The process of flowchart 400 is preferably reduced to a routine that can be executed by controller 101. The descriptive information may include identification or location of a vehicle function, operating instructions to activate or otherwise control a vehicle function, a description of an output from a vehicle function, or other suitable information related to one of the vehicle functions. Table 1 is provided as a key to the process flowchart of FIG. 4, wherein the numerically labeled blocks and the corresponding functions are set forth as follows.

TABLE 1

| BLOCK | BLOCK CONTENTS |
| --- | --- |
| 420 | Select operating section and vehicle function on multi-touch screen |
| 430 | Query in-vehicle controller for information related to the selected operating section and vehicle function |
| 440 | Determine context of query and gather information related to the selected vehicle function of the selected operating section of the vehicle from an in-vehicle database or an off-board database |
| 450 | Select preferred mode for conveying information |
| 460 | Communicate preferred information and modality to in-vehicle controller |
| 465 | Confirm preferred information and modality |
| 470 | Communicate information to user using preferred mode |

Figure 71:
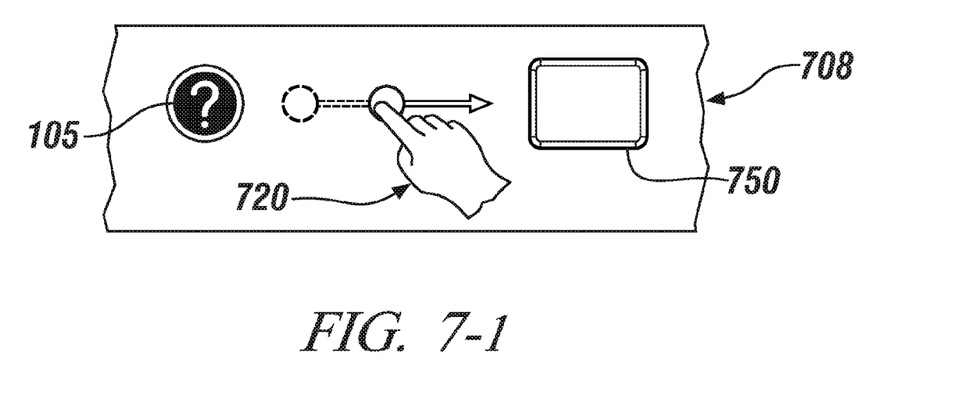
Figure 72:
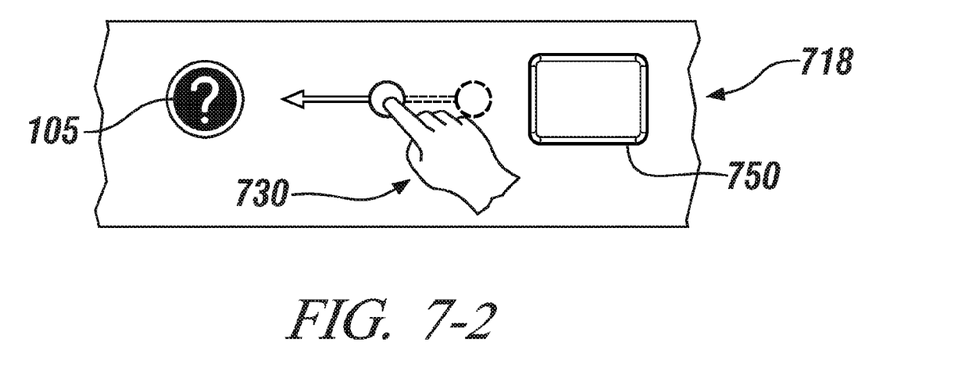

A portion of an exemplary in-vehicle multi-touch screen 408 including a representation of an operating section 410 of the vehicle and a HELP icon 105 are shown. A request for additional descriptive information about a vehicle function can be initiated by a user action 409 that includes dragging the HELP icon 105 onto the selected operating section 410, employing the representation of one of the operating sections 410 of the vehicle and the HELP icon 105 (illustrated in block 420). As shown, the user action 409 includes an action wherein a user, e.g., the driver or passenger, employs a dragging motion on the multi-touch screen 408 to move the HELP icon 105 onto a selected one of the operating sections 410. Alternatively, the user action 409 may include dragging the selected one of the operating sections 410 onto the HELP icon 105 on the multi-touch screen 408. Exemplary user actions are shown with reference to FIGS. 7-1 and 7-2. When the HELP icon 105 overlaps the selected operating section 410, the selected operating section 410 is preferably illuminated on the multi-touch screen 408. The user selects the operating section 410 by removing his finger from the multi-touch screen 408, or by tapping the multi-touch screen 408, or employing another suitable action. Block 420 can be complete at this time.

In an alternative embodiment, a schematic depiction of the selected operating section 410 may be displayed on the multi-touch screen 408. FIG. 3 shows one example in a schematic depiction of the selected operating section 410, depicting steering wheel 170 and a plurality of vehicle functions associated therewith. In such a scenario, one of the vehicle functions can be selected by the user by tapping the multi-touch screen 408 at a location corresponding to the desired vehicle function. Thus, obtaining information may include a multi-layered process that includes selecting one of the aforementioned operating sections of the vehicle using the HELP icon, and then using the HELP icon to select one of the vehicle functions within the selected operating section.

An in-vehicle controller 425 is queried for information related to the selected operating section and vehicle function (430). The in-vehicle controller 425 determines a context of the present query and accesses and gathers information related to the selected vehicle function of the selected operating section of the vehicle from an in-vehicle database 435 or an off-board database 445 that can be interrogated (440). The context of the query includes understanding a nature of the query, i.e., whether there is an inquiry into general operation of a selected vehicle function in the operating section, thus answering the question "What is this vehicle function?", or a request for operating instructions for the selected vehicle function, thus answering the question "How is this vehicle function operated?", or other information. The in-vehicle controller 425 may access information related to the selected operating section or vehicle function from information stored in the in-vehicle database 435. Alternatively, the in-vehicle controller 425 may communicate with the off-board database that resides in a cloud or another remote location to obtain pertinent information related to the operating section or vehicle function. The information may be provided in different modes, including, e.g., a visual schematic diagram, a displayed text, or a video that is displayed on the multi-touch screen 408, or an audio recitation. The information may include illuminating a control knob or other device to activate, manage, or control the selected vehicle function or operating section. The accessed information may include operating instructions when the query relates to a vehicle function that includes a control aspect, such as a cruise control system. The accessed information may include explanatory information when the query relates to a vehicle function that includes an information aspect, such as a gage or lamp on the instrument panel. The in-vehicle controller 425 can determine an appropriate response, e.g., whether the request includes an informational question, a problem, a "how to" question, or another request by querying the user with a screen prompt or an audio question.

The in-vehicle controller 425 selects a preferred mode 455 for delivering the accessed information for the selected operating section of the vehicle to the user, with the preferred mode 455 determined based upon vehicle operation, location of the user in the vehicle (e.g., driver or passenger) and other factors (450). A preferred mode 455 for presenting the accessed information related to the selected vehicle function or operating section of the vehicle is determined based upon vehicle operation and other factors (435). The preferred mode 455 may include presenting only audio information related to the selected vehicle function or operating section of the vehicle when vehicle speed is greater than a minimum speed, e.g., greater than 8 km/h (5 mph) when the user is the vehicle driver. The preferred mode 455 may include presenting audio and visual information related to the selected vehicle function or operating section of the vehicle when vehicle speed is less than the minimum speed or when the user is a passenger in the vehicle. The preferred mode 455 may include presenting only the audio information to the multi-touch screen 408 available to the user when the user is the vehicle operator and vehicle speed is greater than the minimum speed. This may include coincidently presenting video or schematic information to a multi-touch screen that is accessible to a passenger. The accessed information for the selected operating section of the vehicle is communicated to the in-vehicle controller 425 (460), which preferably queries the user to confirm that the accessed information for the selected operating section of the vehicle is correct (465). Querying the user to confirm that the accessed information for the selected operating section of the vehicle is correct can include communicating an overview of the preferred information and mode to the user via audio, visual, or another suitable communication mode, and requesting the user to tap the HELP icon 105 to confirm the preferred information and mode in one embodiment. Querying the user to confirm that the accessed information for the selected operating section of the vehicle is correct can include communicating an overview of the preferred information and modality to the user via audio, visual, or other suitable mode, and prompting the user to provide some form of audio response (YES or NO) or a tactile response to the multi-touch screen 425.

The accessed information related to the selected operating section and the vehicle function is communicated to the user into the passenger compartment of the vehicle employing a suitable format that is consistent with the preferred modality (470). As described herein, information may be communicated to the driver and/or passenger in one of a plurality of modes, including, e.g., a visual schematic diagram, a displayed text, or a video that is displayed on the multi-touch screen, or an audio recitation. The accessed information may include operating instructions and other information that is responsive to the inquiry. The system is able to update probabilities of future selection of information in accordance with any further action taken or not taken by the user. A representation of a plurality of operating sections of the vehicle and a HELP icon 105 is displayed on an in-vehicle multi-touch screen. As described with reference to FIGS. 2 and 3, the display on the multi-touch screen 100 includes schematic representations of an exemplary passenger compartment and a HELP icon. FIGS. 5 and 6 show alternative embodiments of a display of operating sections of the vehicle and a HELP icon on the multi-touch screen 100.

FIG. 7-1 schematically shows a portion of a multi-touch screen 708 that includes HELP icon 105 and an icon 750 representing an operating section of the passenger compartment. As shown, a user action 720 includes an action whereby a user, e.g., the driver or a passenger, employs a dragging motion on the multi-touch screen 708 to move the HELP icon 105 onto the selected operating section 750 to initiate a query for information related to the selected operating section associated with the icon 750, as described herein.

FIG. 7-2 schematically shows a portion of a multi-touch screen 718 that includes HELP icon 105 and icon 750 representing an operating section of the passenger compartment. As shown, a user action 730 includes an action whereby a user, e.g., the driver or a passenger, employs a dragging motion on the multi-touch screen 718 to move the selected operating section 750 onto the HELP icon 105 to initiate a query for information related to the selected operating section associated with the icon 750, as described herein.

The process provides an intuitive, simple, and easy to use method to provide information related to operating, problem-solving and troubleshooting vehicle operation while bypassing a need to search or browse for help, including providing an immediate response to a query. Thus, functionality clutter and information overload is reduced. Specific and relevant help can be launched directly and immediately by intuitive matching between icons. This permits obtaining answers to queries in the vehicle while on-the-go, with a response to a user that is in a mode that is suitable according to the nature of the problem as well as current operating state of the vehicle.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for providing information related to an in-vehicle function, wherein a controller executes the following steps:
    visually displaying on a multi-touch screen a representation of a portion of the vehicle comprising a plurality of operating sections including a plurality of vehicle functions and a HELP icon;
    selecting one of the vehicle functions in response to a user action that includes a dragging motion on the multi-touch screen between the HELP icon the selected vehicle function;
    accessing information related to the selected vehicle function; and
    employing a preferred mode to communicate the information related to the selected vehicle function to the user.

2. The method of claim 1, wherein accessing information related to the selected vehicle function comprises accessing information related to the selected vehicle function from an in-vehicle database.

3. The method of claim 1, wherein accessing information related to the selected vehicle function comprises accessing information related to the selected vehicle function from an off-board database.

4. The method of claim 1, wherein the dragging motion on the multi-touch screen comprises dragging the HELP icon onto the vehicle depicting the selected vehicle function.

5. The method of claim 1, wherein the dragging motion on the multi-touch screen comprises dragging the selected vehicle function onto the HELP icon.

6. The method of claim 1, further comprising querying the user to confirm that the accessed information related to the selected vehicle function is correct prior to employing the preferred mode to communicate the information related to the selected vehicle function to the user.

7. The method of claim 6, wherein querying the user to confirm that the accessed information related to the selected vehicle function is correct comprises communicating an overview of the preferred information and preferred mode to the user and requesting the user to tap the HELP icon to confirm the preferred information and preferred mode.

8. The method of claim 6, wherein querying the user to confirm that the accessed information related to the selected vehicle function is correct comprises communicating an overview of the preferred information and preferred communication mode to the user and prompting the user to provide an audio response.

9. The method of claim 6, wherein querying the user to confirm that the accessed information related to the selected vehicle function is correct comprises communicating an overview of the preferred information and mode to the user and prompting the user to provide a tactile response.

10. The method of claim 1, further comprising visually displaying a complete vehicle schematic drawing on the multi-touch screen, said complete vehicle schematic drawing employable for selecting other vehicle functions in response to a user action that includes a dragging motion on the multi-touch screen between the HELP icon and the selected other vehicle function.

11. The method of claim 1, further comprising automatically selecting the preferred mode to communicate the information related to the selected vehicle function to the user.

12. A processor-implemented method for employing an in-vehicle touch-sensitive audio-visual interactive display device configured to display a virtual vehicle, the method comprising:
  visually depicting a plurality of vehicle functions and a HELP icon on said display device;
  selecting one of the vehicle functions in response to a user action that includes a dragging motion on the display device between the HELP icon and the selected vehicle function;
  accessing information related to the selected vehicle function; and
  communicating the information related to the selected vehicle function to the user.

13. The method of claim 12, wherein accessing information related to the selected vehicle function comprises accessing information related to the selected vehicle function from an in-vehicle database.

14. The method of claim 12, wherein accessing information related to the selected vehicle function comprises accessing information related to the selected vehicle function from an off-board database.

15. The method of claim 12, wherein the dragging motion on the display device between the HELP icon and the selected vehicle function comprises dragging the HELP icon onto a displayed representation of a portion of the vehicle depicting the selected vehicle function.

16. The method of claim 12, wherein the dragging motion on the display device between the HELP icon and the selected vehicle function comprises dragging a displayed representation of a portion of the vehicle depicting the selected vehicle function onto the HELP icon.

17. The method of claim 12, further comprising querying the user to confirm that the accessed information related to the selected vehicle function is correct prior to communicating the information related to the selected vehicle function to the user.

18. The method of claim 17, wherein querying the user to confirm that the accessed information related to the selected vehicle function is correct comprises communicating an overview of the information to the user and requesting the user to tap the HELP icon to confirm the information.

19. The method of claim 17, wherein querying the user to confirm that the accessed information related to the selected vehicle function is correct comprises communicating an overview of the information to the user and prompting the user to provide an audio response.

20. The method of claim 17, wherein querying the user to confirm that the accessed information related to the selected vehicle function is correct comprises communicating an overview of the information to the user and prompting the user to provide a tactile response.

* * * * *